(12) United States Patent
Dolganow et al.

(10) Patent No.: US 8,179,846 B2
(45) Date of Patent: May 15, 2012

(54) DPI-DRIVEN BEARER TERMINATION FOR SHORT-LIVED APPLICATIONS

(75) Inventors: Andrew Dolganow, Kanata (CA); Jason Rusmisel, Ottawa (CA)

(73) Assignee: Alcatel Lucent, Paris (FR)

( * ) Notice: Subject to any disclaimer, the term of this patent is extended or adjusted under 35 U.S.C. 154(b) by 685 days.

(21) Appl. No.: 12/206,364

(22) Filed: Sep. 8, 2008

(65) Prior Publication Data

US 2010/0062781 A1    Mar. 11, 2010

(51) Int. Cl.
*H04W 4/00*    (2009.01)
(52) U.S. Cl. ..................... 370/329; 455/452.1
(58) Field of Classification Search .......... None
See application file for complete search history.

(56) References Cited

U.S. PATENT DOCUMENTS

| 7,289,480 | B2 | 10/2007 | Lundstrom et al. | |
|---|---|---|---|---|
| 2003/0235171 | A1* | 12/2003 | Lundstrom et al. | 370/338 |
| 2007/0058632 | A1* | 3/2007 | Back et al. | 370/392 |
| 2007/0280177 | A1* | 12/2007 | Uusikartano et al. | 370/338 |
| 2009/0252148 | A1* | 10/2009 | Dolganow et al. | 370/351 |

* cited by examiner

*Primary Examiner* — Jianye Wu
(74) *Attorney, Agent, or Firm* — Kramer & Amado P.C.

(57) ABSTRACT

Based on application information received from a DPI device, a downstream device, such as a Radio Network Controller (RNC), optimally implements a dormancy timer policy for short-lived applications, such as email and MMS. In particular, the RNC may initially use a large value for the dormancy timer for these applications. When the RNC receives an indication of the end of the application from the DPI device, the RNC may terminate the connection, thereby immediately freeing up resources. Alternatively, should the DPI device fail to recognize the end of the application, the initial dormancy timer serves as a fail-safe, such that the radio network resources are still released for allocation to another device in the radio network.

23 Claims, 4 Drawing Sheets

DPI-DRIVEN BEARER TERMINATION FOR SHORT-LIVED APPLICATIONS

BACKGROUND OF THE INVENTION

1. Field of the Invention

This invention relates generally to management of bandwidth in a mobile network.

2. Description of Related Art

Wireless devices such as mobile phones and email devices have dramatically changed the way people communicate with one another. With the emergence of compact devices that allow users to make telephone calls, browse the Internet, watch video, and check email, it is easier than ever for people to exchange information. As the ease of communication for end users has increased, however, the burdens placed on the underlying network infrastructure have also increased. In particular, mobile networks must now provide not only voice services, but also data services.

The designers of mobile networks continuously alter mobile networks for the use of wireless devices as the devices evolve to support large amounts of packet data transfer with different application characteristics. Unfortunately, because the voice network handles both phone calls and packet data transfer using the same architecture and resource-reservation protocols, service providers have been forced to compromise service for some applications. In particular, service providers have added data services onto existing voice networks by selecting a small number of data applications for which a guaranteed Quality of Service (QoS) is provided, while providing only best effort service to the remaining applications.

In current mobile networks, upon receipt of a call request, a radio network controller (RNC) or analogous device performs connection admission control (CAC) that guarantees bandwidth resources in the wireless portion of the network. Accordingly, when a user places a call, the network guarantees the user sufficient bandwidth to complete the call without interruption. This scheme simplifies billing for the service provider, as the service provider can simply charge the user based on the total duration of the call.

Similarly, when the network receives a request for a packet data session, the radio network controller reserves a channel for the data transfer. Problems arise with this approach, as consumers expect to be billed based on the amount of data transferred, rather than the connection time. Accordingly, regardless of the amount of time a customer utilizes a reserved channel, the service provider charges the customer based on the amount of data transferred. This creates an incentive for the service provider to minimize the duration for which a channel is reserved for transfer of packet data.

In order to achieve this goal, service providers use a value known as a "dormancy timer." Upon reservation of a channel, the device responsible for bandwidth allocation sets a dormancy timer. As the source and destination transfer packet data over the channel, the channel transitions to an active state. Upon completion of the transfer, the channel enters a dormant state and a timer begins. When this timer exceeds the value of the dormancy timer, the channel is closed and the resources are returned to the network for allocation to another user.

As should be apparent from the above description, the use of a dormancy timer attempts to minimize the allocation of resources for packet data sessions. Because the network bears additional costs when establishing a channel, however, a balance must be reached in setting the value of the dormancy timer. In particular, setting die value of the dormancy timer too low will result in frequent reestablishment of channels, thereby inefficiently consuming resources in creating channels and affecting the quality of the user experience. On the other hand, setting the value too high will result in unnecessary reservation of network channels and wasted bandwidth.

Current implementations unsuccessfully attempt to mitigate this problem, especially for short-lived applications, such as email, Multimedia Messaging Service (MMS), and wireless email device transfers. One implementation relies on the user endpoint to provide information used by the radio network controller in setting the dormancy timer. This approach has proven to be ineffective, as the user endpoint provides information regarding only the client, not the underlying application. For example, the user endpoint may identify the client as a mobile web browser, but would not identify the particular application, such as sending an email or simple web browsing. This results in significant inefficiencies, as the dormancy requirements for an email transfer and a web browsing session differ dramatically.

Another implementation attempts to address dormancy timer inefficiencies by utilizing a variable dormancy timer policy on a per-user basis. In particular, in one implementation, as a user requests resources for a particular application, a network device identifies applications associated with the flow by examining Layer 3 and Layer 4 packet headers. The network device uses the application information to modify a user-specific profile, including a dormancy timer, based on all flows associated with the user. When allocating bandwidth, the base station controller accesses the user-specific profile and the dormancy timer associated with that particular user.

This implementation also fails to effectively implement application-awareness in a manner that optimizes the dormancy timer for short-lived applications. More specifically, this implementation assumes that applications comply with the policies set by the Internet Assigned Numbers Authority, which assigns port numbers for each application. This assumption is often erroneous, as applications often "fake" port or header information in order to avoid detection by header-based filters. Furthermore, this implementation often underestimates the optimal dormancy timer value, such that the timer terminates too early, resulting in wasted resources when a channel is reopened.

Accordingly, there is a need for a system and method that enable effective implementation of dormancy timers for short-lived applications. In particular, there is a need for a solution that accurately detects an application associated with a flow and, when the flow is a short-lived application, modifies the dormancy timer implementation to more effectively utilize network resources.

The problems described above are illustrative of those that are addressed by the various exemplary embodiments and are not intended to be exhaustive or limiting of the possible problems addressed or solved. Thus, other problems solved by the various exemplary embodiments will be apparent to those of ordinary skill in the art.

SUMMARY OF THE INVENTION

In light of the present need for DPI-driven bearer termination for short-lived applications, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In various exemplary embodiments, a mobile network includes a Deep Packet Inspection (DPI) device, such that packets pass through the DPI device prior to forwarding. The DPI device identifies traffic passing through the mobile network based on information extracted from the header and/or payload portion of the incoming packets. Using the information extracted from the packets, the DPI device may add application information to the packet, thereby allowing downstream devices to identify the application for the flow the packet belongs to based on the header inspection only and perform application-specific processing. Alternatively, rather than adding application information to the packet, the DPI device may instead use messages to transmit application information to the downstream or upstream device.

Based on the application information received from the DPI device, the downstream or upstream device, such as a Radio Network Controller (RNC), may optimally implement a dormancy timer policy for short-lived applications, such as email and MMS. In particular, the RNC may initially use a large value for the dormancy timer for these applications. Then, when the RNC receives an indication of the end of the application flow from the DPI device, the RNC may terminate the connection, thereby immediately freeing up resources. Alternatively, should the DPI device fail to recognize the end of the application, the initial dormancy timer serves as a fail-safe, such that the radio network resources are still released for allocation to another device.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Referring now to the drawings, in which like numerals refer to like components or steps, there are disclosed broad aspects of various exemplary embodiments.

Figure 1:
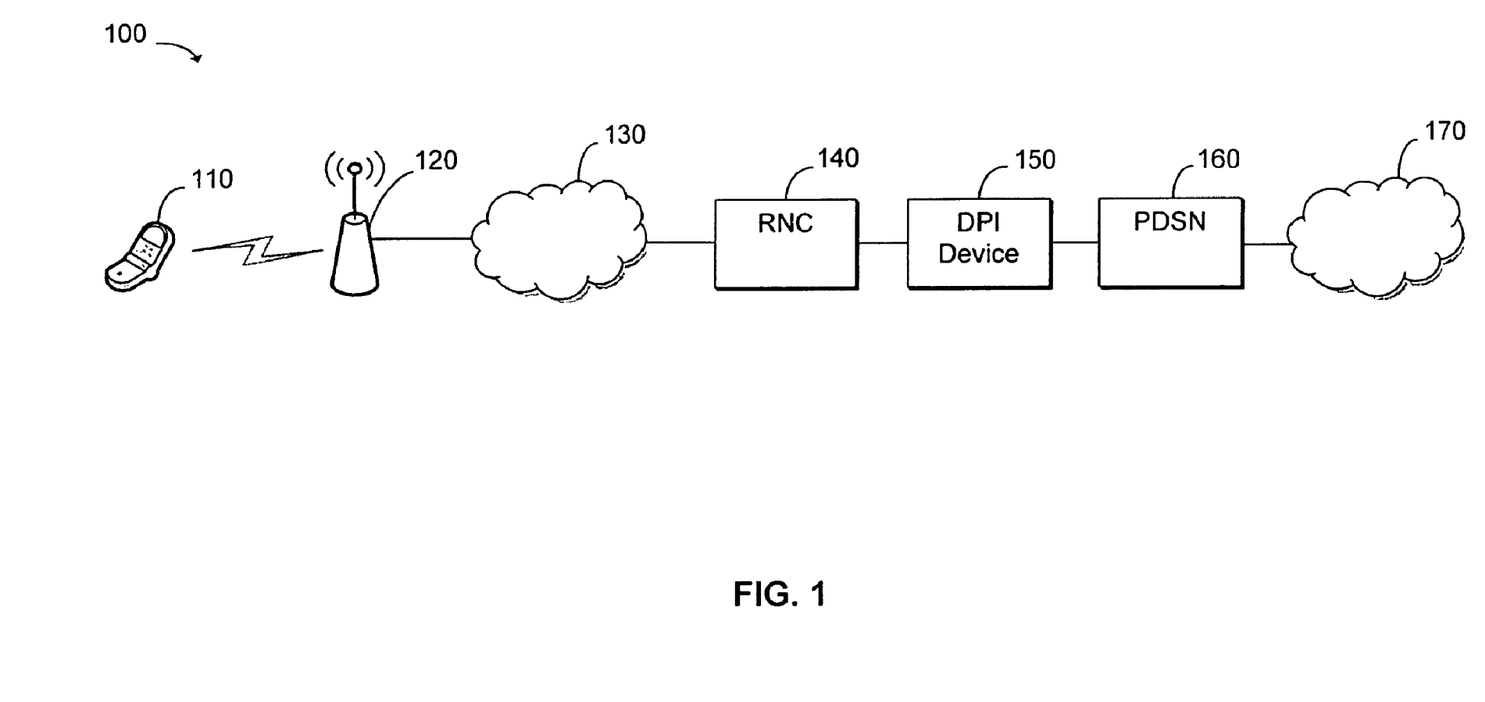
FIG. 1 is a schematic diagram of an exemplary mobile network utilizing in-line DPI to implement bearer termination for short-lived applications.

FIG. 1 is a schematic diagram of an exemplary mobile network 100 utilizing in-line DPI to implement bearer termination for short-lived applications. Exemplary mobile network 100 includes user node 110, wireless base station 120, network 130, radio network controller 140, DPI device 150, packet data serving node 160, and network 170.

In various exemplary embodiments, user node 110 is a device operated by a user that enables access to mobile network 100. More specifically, in various exemplary embodiments, user node 110 is a cell phone, personal digital assistant, personal or laptop computer, wireless email device, or any other device that supports wireless communications. User node 110 may generate and send data packets related to one or more applications or may receive data packets from another wireless or wireline device with connectivity to user node 110 through the mobile network 100.

In various exemplary embodiments, wireless base station 120 is a device including an antenna to wirelessly exchange data with user node 110 over a plurality of radio channels. Furthermore, wireless base station 120 includes a wire line interface to forward data into network 130. Thus, wireless base station 120 may be a Node B in a 3G network or another base transceiver station communicating in a Global System for Mobile Communications (GSM), Universal Mobile Telecommunications System (UMTS), Long Term Evolution (LTE), or other wireless network.

Additionally, in various exemplary embodiments, network 130 provides a connection between wireless base station 120 and radio network controller 140. It should be apparent that network 130 may be any network capable of sending data and requests between wireless base station 120 and radio network controller 140. Accordingly, network 130 may comprise a plurality of routers, switches, bridges, and other components suitable for receiving and forwarding data packets.

In various exemplary embodiments, radio network controller 140 controls and manages a plurality of wireless base stations 120. Thus, radio network controller 140 directs the transmission and reception of data in wireless base station 120 by controlling the radio transmitters and receivers in wireless base station 120. Additionally, radio network controller 140 may manage establishment of channels and set a dormancy timer for each channel. Radio network controller 140 may also receive and transmit packet-switched data between wireless base station 120 and packet data serving node 160.

It should be apparent that a base station controller or any device capable of directing the operation of wireless base station 120 and receiving and transmitting data packets may serve as a replacement for radio network controller 140. For example, radio network controller 140 may instead be a Mobile Management Entity (MME) in an LTE network.

In various exemplary embodiments, radio network controller 140 receives application information inserted into a data packet by DPI device 150 or propagated directly from DPI device 150 to radio network controller 140 through other means that do not affect applications packets like in-band or out-of-band messaging. Radio network controller 140 may then utilize the received application information to determine when to close a bearer.

The internal components of radio network controller 140 are described further below with reference to FIG. 2. Establishment and termination of channels by radio network controller 140 are described further below with reference to FIG. 6.

Mobile network 100 also includes a deep packet inspection device 150 that intercepts, "sniffs," or otherwise receives packets transmitted from user node 110 to a destination in network 170 or from a point in network 170 to user node 110. As described further below with reference to FIG. 5, DPI device 150 receives a packet, identifies characteristics of an application associated with the packet, and adds a marking or other information to the packet to allow downstream application-specific processing and forwarding.

In various exemplary embodiments, DPI device 150 comprises specialized hardware and/or software that are capable of examining data packets received from or transmitted to radio network controller 140 to identify applications associated with the packets. The internal components of DPI device 150 are described further below with reference to FIG. 3.

In various exemplary embodiments, DPI device 150 is integrated into radio network controller 140, into packet data switching node 160, into a network element that is part of a network providing connectivity between radio network controller 140 and packet data switching node 160, or into a network element that is part of network 170. Alternatively, in various exemplary embodiments, DPI device 150 is integrated into wireless base station 120 or a network element that is part of network 130.

It should be apparent, that although illustrated as a standalone device, in various exemplary embodiments, DPI device 150 is a component integrated into a router. Thus, in various exemplary embodiments, DPI device 150 analyzes each packet received by the router before the router forwards the packet to the next hop. Furthermore, in various exemplary embodiments, DPI device 150 instead resides between packet switching data node 160 and network 170.

It should be apparent that DPI device 150 is illustrated as directly connected to radio network controller 140 and packet data serving node 160 for the sake of simplicity. Accordingly, in various exemplary embodiments, one or more switches, routers, bridges, or other network elements are placed between DPI device 150 and radio network controller 140 or packet data serving node 160. Alternatively, DPI device 150 may be placed off-line and obtain replicated traffic sent from or destined for user node 100 for application identification and further application-specific processing.

In various exemplary embodiments, packet data serving node 160 serves as a connection between mobile network 100 and one or more IP networks (not shown). Thus, in various exemplary embodiments, packet data serving node 160 forwards packets between the Internet and radio network controller 140. It should be apparent that packet data serving node 160 may be replaced by a Gateway General Packet Radio Service Support Node (GGSN), a Serving Gateway General Packet Radio Service Support Node (SGSN), Access Serving Gateway, Long Term Evolution (LTE) Serving Gateway or PDN Gateway, or any other node capable of providing a connection between mobile network 100 and an IP network.

In various exemplary embodiments, network 170 receives data from and transmits data to packet data serving node 160. Thus, in various exemplary embodiments, network 170 comprises a plurality of routers, switches, bridges, user nodes and other components suitable for sending, receiving, and forwarding data packets.

It should be apparent that, although illustrated as a 3G wireless network, network 100 may be a different type network. Thus, in various exemplary embodiments, network 100 is a cellular network operating under a different standard, a satellite network, or some other type of network in which optimal implementation of dormancy timers for short-lived application is desired.

Figure 2:
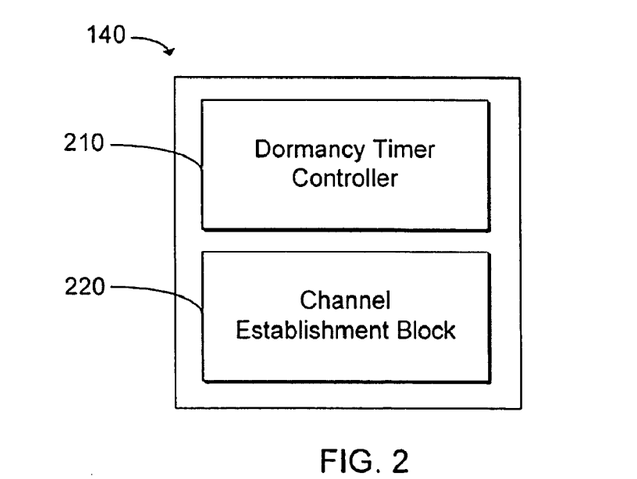
FIG. 2 is a schematic diagram of an exemplary radio network controller for use in the system of FIG. 1.

FIG. 2 is a schematic diagram of an exemplary radio network controller 140 for use in system 100 of FIG. 1. The following description of the components of radio network controller 140 is intended to introduce the functionality of each component. A more detailed explanation of channel establishment and termination will be provided below with reference to FIG. 6.

In various exemplary embodiments, radio network controller 140 includes dormancy timer controller 210 and channel establishment block 220. Dormancy timer controller 210 and channel establishment block 220 may comprise hardware, software, or a combination thereof that executes the functionality required for dormancy timer selection and/or channel establishment. Thus, each component 210, 220 may be a set of instructions encoded on a computer-readable storage medium and configured for execution by a processor. Alternatively, each component 210, 220 may comprise a processor, Field Programmable Gate Array (FPGA), or any other hardware mechanism that may be pre-configured to execute a set of instructions.

In various exemplary embodiments, dormancy timer controller 210 receives application information inserted into a data packet by DPI device 150 or propagated using another form of in-band or out-of-band messaging from DPI device 150. Dormancy timer controller 210 may then process the received application information to manage the termination of a dormancy timer value when modifying a channel. In particular, dormancy timer controller 210 may use the application information received from DPI device 150 to determine when the application associated with the underlying flow has terminated. Then, after termination of the flow, dormancy timer controller 210 may initiate termination of the bearer used for transmission of the flow.

In various exemplary embodiments, channel establishment block 220 establishes and modifies radio channels. Thus, channel establishment block 220 may receive a data packet, determine whether a new channel is required, and then reserve bandwidth in the mobile network for transmission of packets belonging to the flow.

Channel establishment block 220 may also implement the functionality required to modify or terminate a bearer based on instructions received from dormancy timer controller 210. In particular, when dormancy timer controller 210 receives a message from DPI processor 150 that the application has ended, dormancy timer controller 210 may forward this signal to channel establishment block 220. Channel establishment block 220 may, in turn, close the bearer, thereby freeing resources in the network.

It should be apparent that, although described above as distinct components, dormancy timer controller 210 and channel establishment block 220 may be merged into fewer modules. Alternatively, the functions performed by one or more of the components 210, 220 may be separated into multiple components, such that radio network controller 140 includes additional components. Alternative arrangements of the functionality of radio network controller 140 will be apparent to those of ordinary skill in the art.

Furthermore, RNC 140 may include other components known to those of skill in the art. For example, RNC 140 may include a receiving module configured to receive packets, messages, and other information from user node 110, DPI device 150, or any other component in network 100. RNC 140 may also include a transmitting module configured to send packets, messages, and other information to user node 110, DPI device 150, or any other component in network 100.

Figure 3:
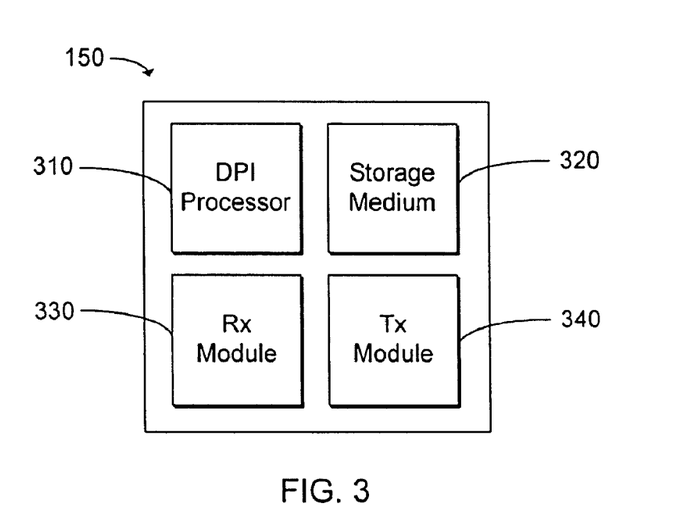
FIG. 3 is a schematic diagram of an exemplary deep packet inspection device for use in the system of FIG. 1.

FIG. 3 is a schematic diagram of an exemplary deep packet inspection device 150 for use in system 100 of FIG. 1. In various exemplary embodiments, DPI device 150 includes a DPI processor 310, a computer-readable storage medium 320, a receiving module 330, and a transmitting module 340.

In various exemplary embodiments, DPI processor 310 is a microprocessor or executable software encoded on a computer-readable medium. DPI processor 310 is configured to examine any combination of information in layers 2 through 7 of the Open Systems Interconnection (OSI) model. Thus, in various exemplary embodiments, DPI processor 310 performs a "deep" analysis of one or more packets in order to identify an application associated with the packets. For example, DPI processor 310 may analyze packets in a flow to determine whether the flow relates to email, streaming video, web browsing, peer-to-peer transfer, VoIP, teleconferencing, or any other application of interest to the service provider. DPI processor 310 may also identify when the application has ended based on underlying characteristics of the application and/or control protocol messages.

In various exemplary embodiments, DPI device 150 includes a computer-readable storage medium 320, such as flash memory, Random Access Memory (RAM), a hard drive, or another suitable storage medium known by those of skill in the art. Storage medium 320 may temporarily store packets prior to forwarding and store information used to identify the application associated with a flow. For example, because several packets are often necessary to accurately identify an application, storage medium 320 may temporarily store previously forwarded packets for each flow.

In addition, DPI device 150 may include a receiving module 330 and a transmitting module 340, which may be a combination of hardware and software. Receiving module 330 may be configured to receive packets from RNC 140 and PDSN 160. Transmitting module 340 may be configured to transmit packets to RNC 140 and PDSN 160. It should be apparent, however, that both modules may be configured to communicate with any device in network 100.

Figure 4:
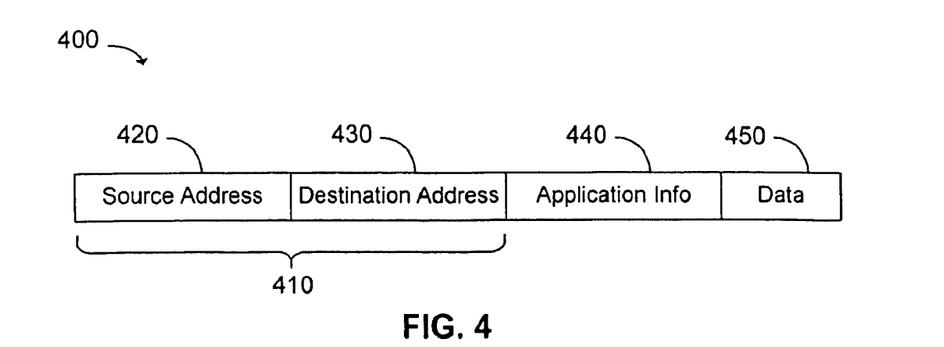
FIG. 4 is a schematic diagram of an exemplary Layer 3 packet including one or more fields for storing application information.

FIG. 4 is a schematic diagram of an exemplary L3 packet 400 including one or more fields for storing application information. Packet 400 may be used to forward application information from DPI processor 150 to RNC 140, such that RNC 140 may close a bearer based on the contents of packet 400. In various exemplary embodiments, L3 packet 400 includes, among other fields, packet header 410, source address 420, destination address 430, application information 440, and payload 450.

In various exemplary embodiments, packet header 410 includes data used to forward packet 400 from a source to a destination. Thus, in various exemplary embodiments, packet header 410 includes a source address 420, which may include a source IP address and a source port. Furthermore, in various exemplary embodiments, packet header 410 includes destination address 430, which may include a destination IP address and a destination port.

Furthermore, packet 400 includes application information 440, which, in various exemplary embodiments, identifies an application associated with packet 400 and characteristics of the application, such as the end of the application. In various exemplary embodiments, application information 440 is placed into an IP header extension, which may be an additional header inserted between packet header 410 and payload 450 of packet 400. Thus, in various exemplary embodiments, application information 440 consists of one or more type length values (TLV) indicating a name, alphanumeric identifier, or other information identifying an application associated with packet 400. It should be apparent that, instead of an alphanumeric value, any information suitable for identifying the application and associated characteristics may be placed in application information 440.

Furthermore, it should be apparent that packet header 410 is shown as including only source address field 420 and destination address 430 for the sake of simplicity. Thus, in various exemplary embodiments, packet header 410 includes additional fields including, but not limited to, a protocol number, traffic class, flow label, payload length, next header, and hop limit. Furthermore, it should be apparent that packet 400 may be an IP packet, Transmission Control Protocol (TCP) packet, User Datagram Protocol (UDP) packet, GRE packet, a packet formatted according to a proprietary protocol, or a packet formatted in any other protocol that may be modified to include application information.

Figure 5:
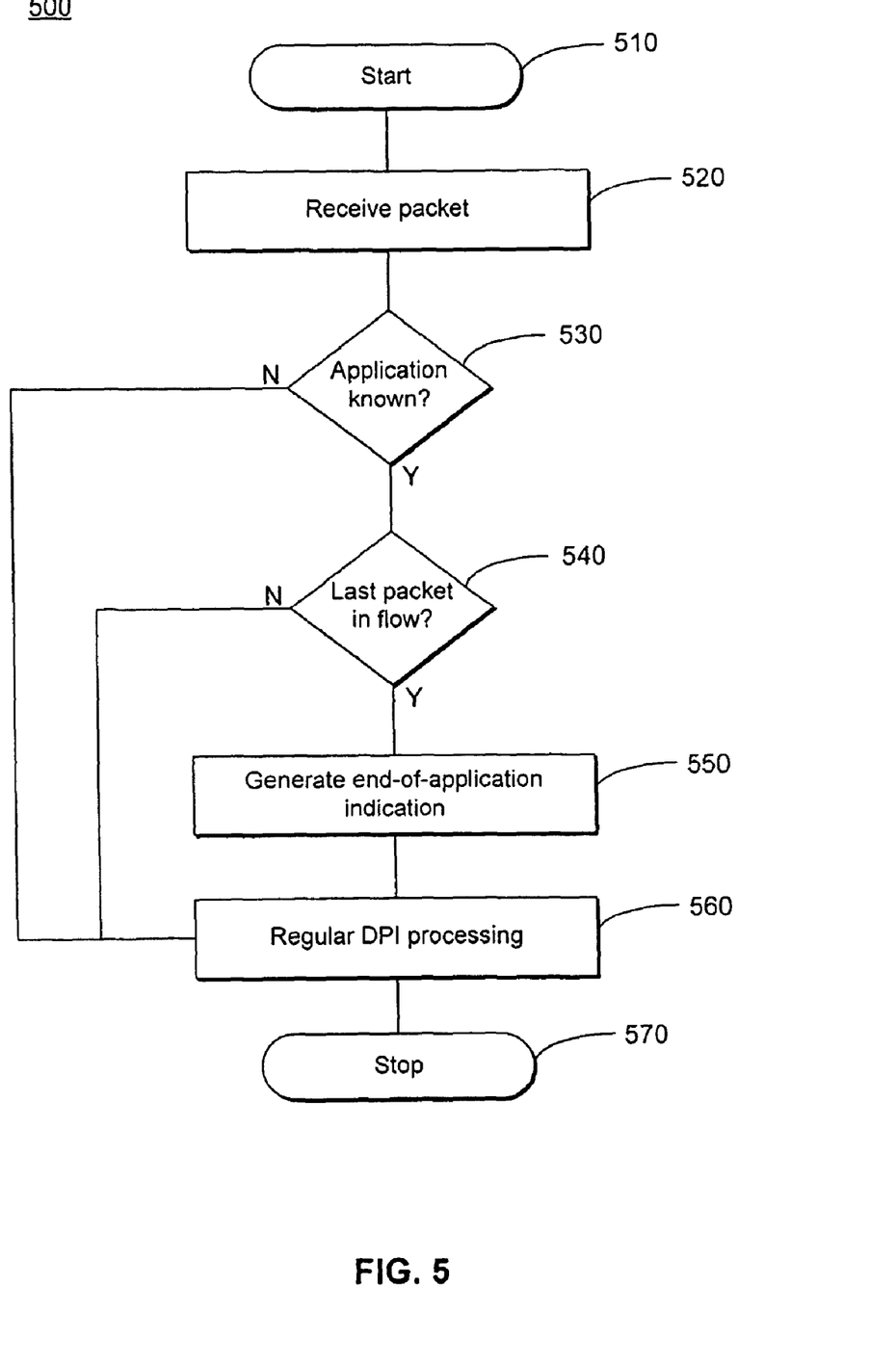
FIG. 5 is a flowchart of an exemplary embodiment of a method for using a deep packet inspection device to forward an end-of-application indication to a downstream device.

FIG. 5 is a flow chart of an exemplary embodiment of a method 500 for using a deep packet inspection device to forward a bearer termination indication to a downstream device. Exemplary method 500 starts in step 510 and proceeds to step 520, where DPI device 150 intercepts, sniffs, or otherwise receives a packet transmitted from a source node to a destination node.

Exemplary method 500 then proceeds to decision step 530, where DPI device 150 determines whether the application flow is known. Thus, DPI device 150 may, for example, access application information stored in storage medium 320 to determine whether the application flow has been previously identified by DPI device 150. Furthermore, DPI device 150 may identify a flow associated with the packet using header information from the packet, then perform DPI processing on the identified flow. Thus, in various exemplary embodiments, DPI device 150 examines any combination of information in Open Systems Interconnection (OSI) layers 2 through 7 of one or more packets from this and other IP flows to identify an application associated with the flow.

When, in decision step 540, DPI device 150 determines that the application is not yet known, exemplary method 500 proceeds directly to step 560, described in further detail below. Alternatively, when DPI device 150 determines in decision step 530 that the application is known, exemplary method 500 proceeds to decision step 540, where DPI device 150 determines whether the packet received in step 520 is the last packet in the flow identified in step 530.

In particular, DPI device 150 may examine any combination of information in Layers 2-7 of the packet. This may include, for example, examination of the data plane to identify a TCP_FIN packet or examination of the control plane to identify a SIP end of session message. Furthermore, DPI device 150 may identify the end of the flow using characteristics of the application by examining information contained in the session, presentation, and application layers of the packet. It should be apparent that, unlike a typical L3-L4 filter, DPI device 150 may reliably identify the end of the application from the packet because DPI device 150 is aware of the characteristics of the underlying application.

When, in decision step 540, DPI device 150 determines that the packet is not the last packet in the application flow, exemplary method 500 proceeds directly to step 560, described in further detail below. Alternatively, when DPI device 150 determines that the packet is the last packet in the application flow, exemplary method 500 proceeds to step 550.

In step 550, DPI device 150 generates an end-of-application indication. This indication may include at least one of an identification of the user endpoint, a bearer identification, and an IP 5-tuple associated with the flow. It should be apparent, however, that any information may be used that allows RNC 140 or another downstream device to reliably identify the bearer used for the flow.

In various exemplary embodiments, DPI device 150 adds the end-of-application indication to a field in the packet. More particularly, DPI device 150 may add the end-of-application indication to an IP header extension or a proprietary protocol extension. Alternatively, DPI device 150 may add the end-of-application indication to at least one of a key field and a sequence number field of a GRE packet header. It should be apparent that, in various exemplary embodiments, DPI device 150 adds the end-of-application indication to any field in the packet, provided that a downstream or upstream device may extract the indication.

As an alternative to adding information directly to the packet, various exemplary embodiments generate an in-band or out-of-band message that may be sent from DPI device 150 to the downstream device. For example, DPI device 150 may generate and send a message including the end-of-application indication. Those of skill in the art will appreciate that any method of message exchange may be employed to send the end-of-application indication from DPI device 150 to the downstream or upstream device.

After DPI device 150 generates the end-of-application notification in step 550, exemplary method 500 proceeds to step 560. In step 560, DPI device 150 continues normal DPI and packet processing. For example, DPI device 150 may forward the packet, drop the packet, select and implement a QoS policy based on the identified application, gather statistics, or perform any other operation. Other typical packet processing operations performed by DPI device 150 will be apparent to those of ordinary skill in the art. Exemplary method 500 then proceeds to step 570, where exemplary method 500 stops.

Figure 6:
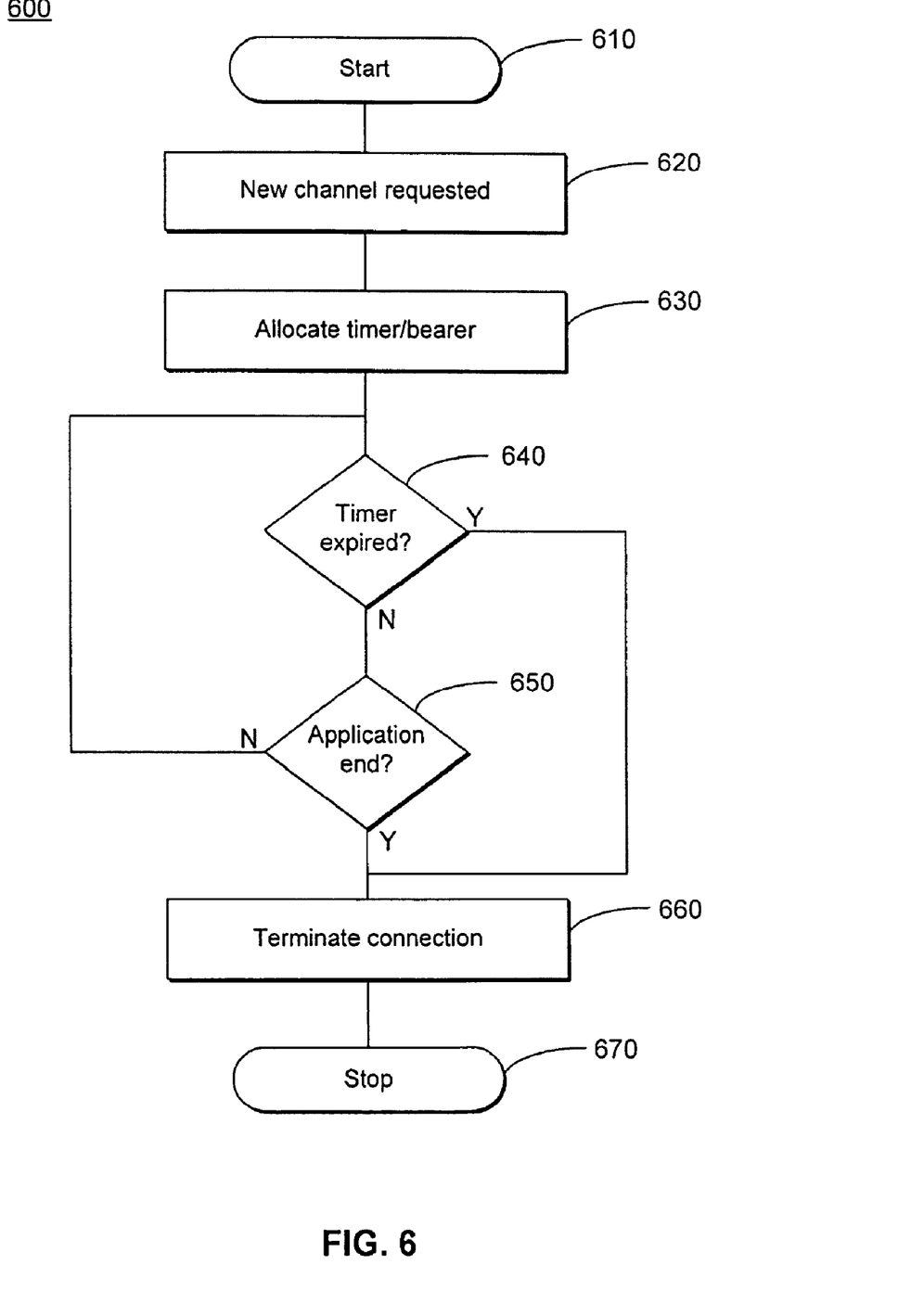
FIG. 6 is a flowchart of an exemplary embodiment of a method for establishing and terminating a channel in a mobile network.

FIG. 6 is a flow chart of an exemplary embodiment of a method 600 for establishing and terminating a channel in a mobile network 100. The processing steps of method 600 may be performed by RNC 140. It should be apparent, however, that any device that manages the allocation of resources in system 100 may perform method 600.

Exemplary method 600 starts in step 610 and proceeds to step 620, where RNC 140 receives a request for a new channel. In particular, user node 110 may send a signal to RNC 140 indicating that the user desires transmit and receive data packets using the radio network and that a new channel is required.

After receiving the request for a new channel in step 620, exemplary method 600 proceeds to step 630, where RNC 140 allocates a dormancy timer and establishes a bearer. In particular, dormancy timer controller 210 of RNC 140 may use a fixed dormancy timer value for all flows. Because RNC 140 will receive a notification when an application flow has ended, RNC 140 may initially set this value to be relatively high, such that the dormancy timer functions as a failsafe in the event that DPI device 150 fails to detect the end of the application. After determining the dormancy timer to be used, channel establishment block 220 of RNC 140 reserves resources for the user by establishing a bearer.

Upon establishment of the channel in step 630, RNC 140 begins execution of the steps required to monitor the channel. In particular, exemplary method 600 proceeds to decision step 640, where RNC 140 determines whether the dormancy timer has expired. Thus, when the application has failed to send a packet for a time exceeding the value of the dormancy timer, exemplary method 600 proceeds to step 660, where the connection is terminated.

Alternatively, when RNC 140 determines that the dormancy timer has not expired, exemplary method 600 proceeds to decision step 650. In decision step 650, RNC 140 determines whether an end-of-application indication has been received from DPI device 150. More specifically, RNC 140 checks a packet belonging to the flow for presence of an end-of-application indication or receives an in-band or out-of-band message from DPI device 150.

In various exemplary embodiments, a single dormancy timer value is allocated for multiple applications. Thus, in these embodiments, RNC 140 determines, in decision step 650, whether the last application sharing the dormancy timer has ended. More particularly, this step will only be satisfied when the last active application terminates.

When, in decision step 650, RNC 140 determines that the application has not ended, exemplary method 600 returns to decision step 640. Alternatively, when RNC 140 determines that the application has ended, RNC 140 extracts any information included with the indication, including a user endpoint identification, bearer identification, or IP 5-tuple. Exemplary method 600 then proceeds to step 660.

In step 660, RNC 140 takes any action necessary to terminate the connection. More specifically, RNC 140 overwrites any dormancy timer for the connection and closes the bearer. As a result, RNC 140 immediately releases the network resources previously occupied by the flow, such that another application may use the resources. Exemplary method 600 then proceeds to step 670, where exemplary method 600 stops.

According to the foregoing, various exemplary embodiments, provide a mechanism for more efficient implementation of dormancy timers for short-lived applications in a radio network. In particular, a DPI device detects the end of an application flow, such that resources are immediately released upon the end of an application. The radio network controller may therefore free up network resources instantaneously, rather than waiting for expiration of the dormancy timer. This provides significant benefits, as the radio network controller may provide a long dormancy timer by default, thereby ensuring that channels are not prematurely closed. At the same time, the radio network controller only reserves network resources as long as necessary for termination of the short-lived application. Other advantages and benefits provided for by the embodiments described herein will be apparent to those of skill in the art.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A device for managing termination of radio channels in a mobile network, the device comprising:
   a receiver that receives a request for establishment of a radio channel, the radio channel used for transmission of data packets associated with a flow;
   a channel establishment block that establishes the radio channel and sets a value of a corresponding dormancy timer; and
   a dormancy timer controller that receives an end-of-application indication from a Deep Packet Inspection (DPI) device, the end-of-application specifying that an application associated with the flow has ended wherein the end-of-application indication is located in one of key field and a sequence number field of a GRE packet header and triggering termination of the radio channel associated with the flow upon receipt of either the end-of-application indication from the DPI device or expiration of the dormancy timer.

2. The device of claim 1, wherein the DPI device sends the end-of-application indication to the dormancy timer controller by inserting information into a data packet associated with the flow.

3. The device of claim 1, wherein the DPI device sends the end-of-application indication to the dormancy timer controller using a message separate from data packets associated with the flow.

4. The device of claim 1, wherein the end-of-application indication includes an identification of a user endpoint that initiated the flow.

5. The device of claim 1, wherein the end-of-application indication includes an identification of the radio channel.

6. The device of claim 1, wherein the end-of-application indication includes an Internet Protocol (IP) 5-tuple associated with the flow.

7. The device of claim 1, wherein the device is a radio network controller (RNC) in a Third Generation (3G) network.

8. The device of claim 1, wherein the device is selected from a group consisting of a mobile management entity (MME), a Serving Gateway, and a Packet Data Network (PDN) Gateway in a Long Term Evolution (LTE) network.

9. The device of claim 1, wherein the application is selected from a group consisting of email, a Short Message Service (SMS), and a Multimedia Messaging Service (MMS).

10. The device of claim 1, wherein the radio channel is used for transmission of data packets associated with a plurality of flows, and the dormancy timer controller triggers termination of the radio channel upon either receipt of the end-of-application indication for a last active flow in the channel or expiration of the dormancy timer.

11. A method for managing termination of radio channels in a mobile network, the method comprising:
receiving a request for establishment of a radio channel for transmission of packets associated with a flow;
establishing the radio channel and setting a value of a corresponding dormancy timer;
performing deep packet inspection (DPI) using a DPI device on at least one packet belonging to the flow to determine whether an application associated with the flow has ended;
receiving an end-of-application indication from the DPI device, the end-of-application indication specifying that an application associated with the flow has ended wherein the end-of-application indication is located in one of key field and a sequence number field of a GRE packet header;
overwriting the dormancy timer after receipt of the end-of-application indication; and
terminating the radio channel in response to either receipt of the end-of-application indication from the DPI device or expiration of the dormancy timer.

12. The method of claim 11, further comprising:
sending, with the DPI device, the end-of-application indication by inserting information into a data packet associated with the flow.

13. The method of claim 11, further comprising:
sending, with the DPI device, the end-of-application indication using a message separate from data packets associated with the flow.

14. The method of claim 11, wherein the end-of-application indication includes an identification of a user endpoint that initiated the flow.

15. The method of claim 11, wherein the end-of-application indication includes an identification of the radio channel.

16. The method of claim 11, wherein the end-of-application indication includes an Internet Protocol (IP) 5-tuple associated with the flow.

17. The method of claim 11, further comprising:
using the radio channel for transmission of data packets associated with a plurality of flows; and
terminating the radio channel only upon receipt of the end-of-application indication for a last active flow in the channel.

18. A mobile network configured for efficient termination of radio channels, the mobile network comprising:
a user node that receives and transmits data packets;
a deep packet inspection (DPI) device that examines information contained in Layers 2 through 7 of data packets in a flow initiated by the user node, the DPI device detecting when an application associated with the flow has ended; and
a device that manages allocation of bandwidth in the mobile network, the device comprising:
a receiver that receives a request for establishment of a radio channel for transmission of data packets associated with the flow,
a channel establishment block that establishes the radio channel and sets a value of a corresponding dormancy timer, and
a dormancy timer controller that receives an end-of-application indication from the DPI device wherein the end-of-application indication is located in one of key field and a sequence number field of a GRE packet header and triggers termination of the radio channel associated with the flow upon receipt of either the end-of-application indication from the DPI device or expiration of the dormancy timer.

19. The mobile network of claim 18, wherein the DPI device sends the end-of-application indication to the dormancy timer controller by inserting information into a data packet associated with the flow.

20. The mobile network of claim 18, wherein the DPI device sends the end-of-application indication to the dormancy timer controller using a message separate from data packets associated with the flow.

21. The mobile network of claim 18, wherein the end-of-application indication includes an identification of the user node.

22. The mobile network of claim 18, wherein the end-of-application indication includes an identification of the radio channel.

23. The mobile network of claim 18, wherein the radio channel is used for transmission of data packets associated with a plurality of flows, and the dormancy timer controller triggers termination of the radio channel upon the first of receipt of the end-of-application indication for a last active flow in the channel and expiration of the dormancy timer.

* * * * *